US011428410B2

(12) United States Patent
Freeman et al.

(10) Patent No.: US 11,428,410 B2
(45) Date of Patent: Aug. 30, 2022

(54) COMBUSTOR FOR A GAS TURBINE ENGINE WITH CERAMIC MATRIX COMPOSITE HEAT SHIELD AND SEAL RETAINER

(71) Applicants: Rolls-Royce Corporation, Indianapolis, IN (US); Rolls-Royce North American Technologies Inc., Indianapolis, IN (US)

(72) Inventors: Ted J. Freeman, Danville, IN (US); Aaron D. Sippel, Zionsville, IN (US); Paulo Bazan, Coconut Creek, FL (US)

(73) Assignees: Rolls-Royce Corporation, Indianapolis, IN (US); Rolls-Royce North American Technologies Inc., Indianapolis, IN (US)

(*) Notice: Subject to any disclaimer, the term of this patent is extended or adjusted under 35 U.S.C. 154(b) by 254 days.

(21) Appl. No.: 16/596,257

(22) Filed: Oct. 8, 2019

(65) Prior Publication Data

US 2021/0102701 A1    Apr. 8, 2021

(51) Int. Cl.
*F23R 3/00* (2006.01)
*F23R 3/28* (2006.01)
*F23R 3/60* (2006.01)
*F02C 7/28* (2006.01)

(52) U.S. Cl.
CPC .............. *F23R 3/007* (2013.01); *F23R 3/002* (2013.01); *F23R 3/283* (2013.01); *F02C 7/28* (2013.01); *F23R 3/60* (2013.01); *F23R 2900/00012* (2013.01)

(58) Field of Classification Search
CPC ............. F23R 3/007; F23R 3/283; F23R 3/60
See application file for complete search history.

(56) References Cited

U.S. PATENT DOCUMENTS

| 5,222,358 | A | | 6/1993 | Chaput et al. |
|---|---|---|---|---|
| 5,271,219 | A | | 12/1993 | Richardson |
| 5,419,115 | A | * | 5/1995 | Butler ................. F23R 3/283 60/740 |
| 5,463,864 | A | * | 11/1995 | Butler ................. F23R 3/283 60/800 |
| 5,956,955 | A | | 9/1999 | Schmid |
| 5,996,335 | A | | 12/1999 | Ebel |
| 6,679,063 | B2 | | 1/2004 | Ebel |
| 7,478,534 | B2 | | 1/2009 | Guezengar et al. |
| 7,617,689 | B2 | | 11/2009 | Schumacher et al. |
| 7,665,306 | B2 | | 2/2010 | Bronson et al. |
| 7,775,051 | B2 | | 8/2010 | Hernandez et al. |
| 7,845,174 | B2 | | 12/2010 | Parkman et al. |
| 7,861,530 | B2 | | 1/2011 | Hawie et al. |
| 7,926,280 | B2 | | 4/2011 | Morenko et al. |

(Continued)

*Primary Examiner* — Katheryn A Malatek
*Assistant Examiner* — Alyson Joan Harrington
(74) *Attorney, Agent, or Firm* — Barnes & Thornburg LLP

(57) ABSTRACT

A combustor for a gas turbine engine includes a combustor shell, a heat shield and a burner seal. The combustor shell includes metallic materials and is formed to define an interior combustion space. The heat shield includes ceramic matrix composite materials and is configured to shield a portion of the combustor shell from the interior combustion space. The burner seal includes ceramic matrix composite materials and is configured to extend through apertures formed in the combustor shell and the heat shield.

9 Claims, 8 Drawing Sheets

(56) References Cited

U.S. PATENT DOCUMENTS

| | | | |
|---|---|---|---|
| 8,943,835 B2 | 2/2015 | Corsmeier et al. | |
| 9,222,675 B2 | 12/2015 | Gerendas | |
| 9,243,561 B2 | 1/2016 | Carlisle | |
| 9,803,869 B2 | 10/2017 | Clemen et al. | |
| 9,964,309 B2 | 5/2018 | Corsmeier et al. | |
| 10,041,415 B2 | 8/2018 | Clemen et al. | |
| 2008/0229750 A1 | 9/2008 | Sipson | |
| 2011/0030377 A1* | 2/2011 | Lockyer | F23R 3/002 60/752 |
| 2018/0094812 A1 | 4/2018 | Corsmeier | |
| 2018/0202659 A1* | 7/2018 | Stieg | F23R 3/60 |

* cited by examiner

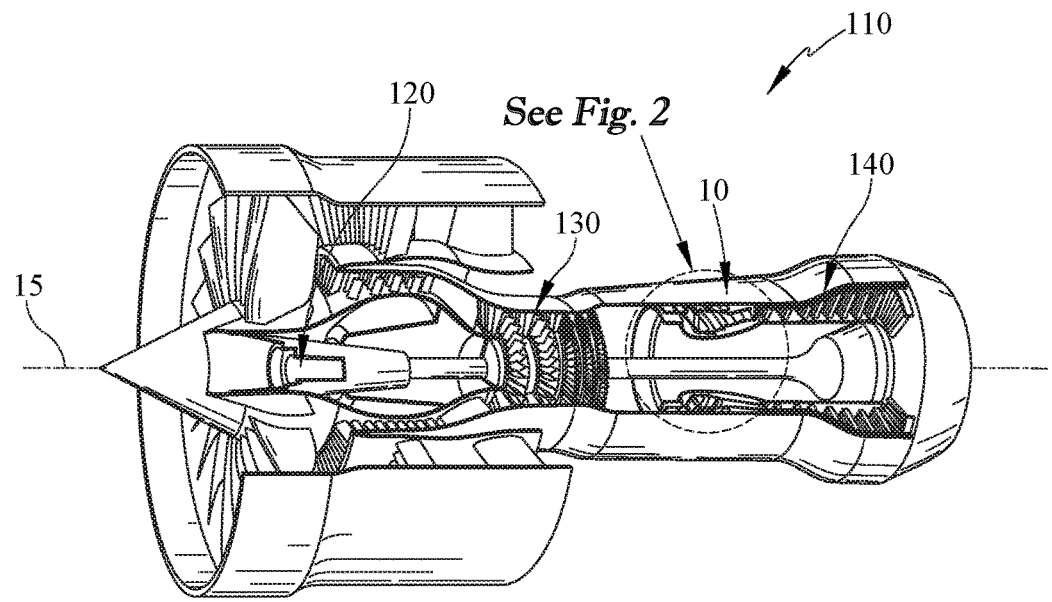
FIG. 1
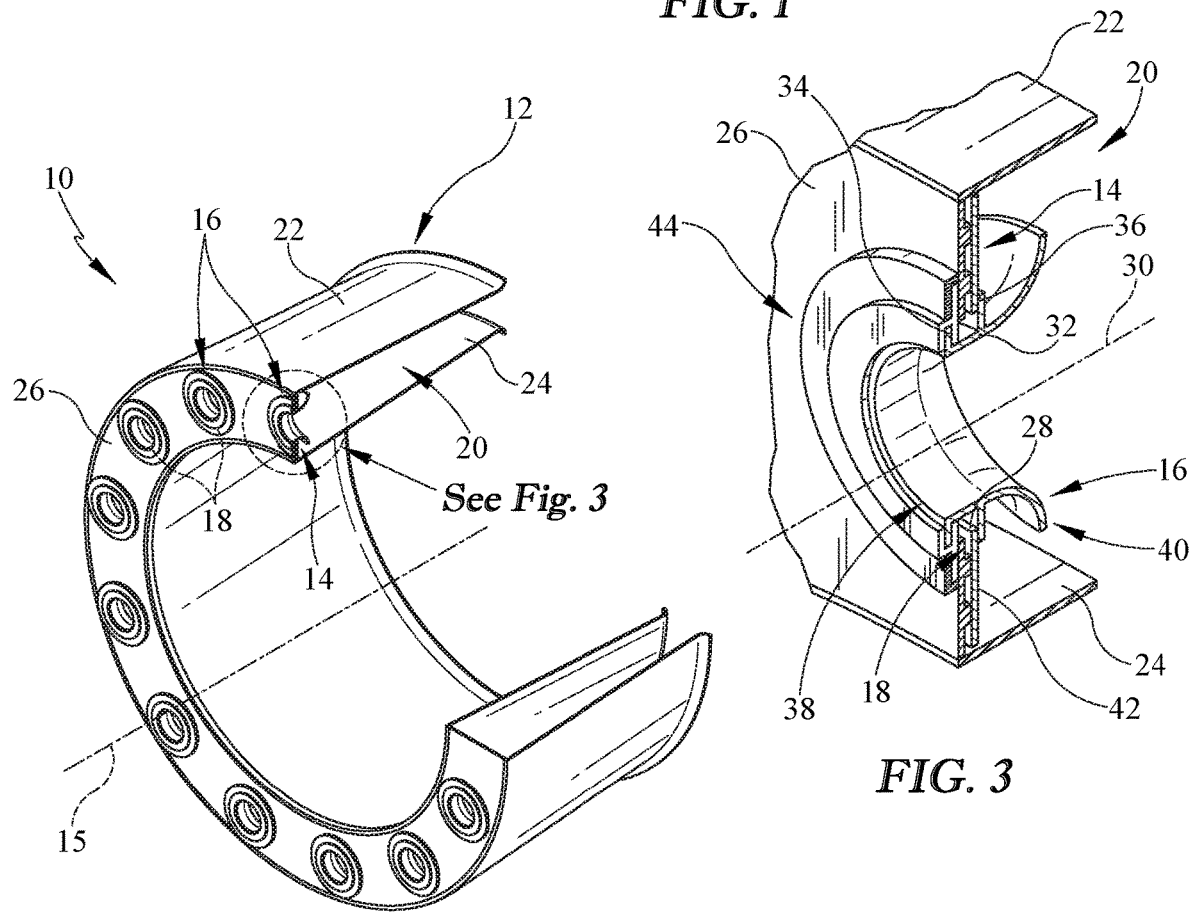
FIG. 2
FIG. 3

COMBUSTOR FOR A GAS TURBINE ENGINE WITH CERAMIC MATRIX COMPOSITE HEAT SHIELD AND SEAL RETAINER

FIELD OF THE DISCLOSURE

The present disclosure relates generally to combustors used in gas turbine engines, and more specifically to a combustor including a metallic case and a heat shield.

BACKGROUND

Engines, and particularly gas turbine engines, are used to power aircraft, watercraft, power generators and the like. Gas turbine engines typically include a compressor, a combustor, and a turbine. The compressor compresses air drawn into the engine and delivers high pressure air to the combustor. The combustor is a component or area of a gas turbine engine where combustion takes place. In a gas turbine engine, the combustor receives high pressure air and adds fuel to the air which is burned to produce hot, high-pressure gas. After burning the fuel, the hot, high-pressure gas is passed from the combustor to the turbine. The turbine extracts work from the hot, high-pressure gas to drive the compressor and residual energy is used for propulsion or sometimes to drive an output shaft.

Combustors include heat shields that protect other components from burning fuel during operation of a gas turbine engine. The heat shield included in the combustor is designed and built to withstand high-temperatures induced during combustion. In some cases, heat shields may be made from metallic superalloys. In other cases, heat shields may be made from ceramic matrix composites (CMCs) which are a subgroup of composite materials as well as a subgroup of technical ceramics. CMCs may comprise ceramic fibers embedded in a ceramic matrix. The matrix and fibers can consist of any ceramic material, in which carbon and carbon fibers can also be considered a ceramic material.

Combustors and turbines made of metal alloys often require significant cooling to be maintained at or below their maximum use temperatures. The operational efficiencies of gas turbine engines are sometimes increased with the use of CMC materials that require less cooling and have operating temperatures that exceed the maximum use temperatures of most metal alloys. The reduced cooling required by CMC combustor heat shields when compared to metal alloy combustion heat shields can permit greater temperature uniformity and can lead to reduced undesirable emissions.

One challenge relating to the use of CMC heat shields is that they are sometimes secured to the surrounding metal shell via metal fasteners. Metal fasteners can lose their strength and may even melt at CMC operating temperatures. Since the allowable operating temperature of a metal fastener is typically lower than the allowable operating temperature of the CMC, metal fasteners, and/or the area surrounding it, is often cooled to allow it to maintain its strength. Another challenge to mounting CMC components is the mismatch in thermal expansion rates between CMC components and surrounding metallic components. Such configurations may undermine the desired high temperature capability of the CMC. Accordingly, new techniques and configurations are needed for coupling components, such as CMC, to the walls of enclosures experiencing high-temperature environments.

SUMMARY

The present disclosure may comprise one or more of the following features and combinations thereof.

According to one aspect of the present disclosure, a combustor for use in a gas turbine engine includes a combustor shell, a heat shield, a burner seal, and a burner seal retainer. The combustor shell includes metallic materials and is adapted to be mounted in a gas turbine engine and formed to define an interior combustion space. The combustor shell includes an outer annular wall that extends circumferentially around a central reference axis. The combustor shell may further include an inner annular wall arranged radially inward from the outer annular wall to provide the interior combustion space between the outer annular wall and the inner annular wall. The combustor shell may further include a dome panel coupled to axially-forward ends of the outer annular wall and the inner annular wall. The dome panel may be formed to include a plurality of fuel nozzle apertures spaced circumferentially around the central reference axis.

In some embodiments, the heat shield includes ceramic matrix composite materials and is configured to shield a portion of the dome panel from the interior combustion space. The heat shield may be formed to include a heat-shield aperture. In some embodiments, the burner seal includes ceramic matrix composite materials. The burner seal may be arranged to extend through one of the fuel nozzle apertures included in the plurality of fuel nozzle apertures and the heat-shield aperture along a burner seal axis In some embodiments, the burner seal retainer includes metallic materials and arranged axially forward of the dome panel in engagement with the burner seal to couple the burner seal to the dome panel in a fixed axial position relative to the burner seal axis. In some embodiments, the burner seal is sized relative to the dome panel and burner seal retainer such that the burner seal is floating to allow movement of the burner seal radially and circumferentially relative to the dome panel and the burner seal retainer as the dome panel and the burner seal retainer grow thermally at an expansion rate not equal to an expansion rate of the burner seal.

In some embodiments, the burner seal includes a burner seal body with an inlet end and an outlet end spaced axially from the inlet end, an inlet flange at the inlet end that extends radially outward from the burner seal body relative to the burner seal axis, and a retainer flange spaced axially between the inlet end and outlet end that extends radially outward from the burner seal body relative to the burner seal axis.

In some embodiments, the inlet flange has a first diameter and the fuel nozzle aperture has a second diameter greater than the first diameter so that the burner seal is inserted through the fuel nozzle aperture from the aft side of the dome panel.

In some embodiments, the heat-shield aperture has a third diameter that is greater than the first diameter of the inlet flange and the retainer flange has a fourth diameter that is greater than the third diameter so that the retainer flange engages the an aft surface of the heat shield to retain the heat shield to the dome panel after the burner seal is inserted through the fuel nozzle aperture and the heat-shield aperture.

In some embodiments, the burner seal retainer includes a first retainer half-ring formed to include a first semi-circular channel and a second retainer half-ring formed to include a second semi-circular channel and the inlet flange is received in the first and second semi-circular channels when the burner seal retainer is installed on the burner seal.

In some embodiments, each retainer half-ring includes a mount plate coupled to an axially forward surface of the dome panel, a link segment coupled to the mount plate and arranged to extend axially forward from the mount plate, and a retainer plate coupled to the link segment and spaced apart from the mount plate to provide the first and second semi-circular channels axially between the mount plate and the retainer plate.

In some embodiments, the inlet flange has a distal end spaced apart from a radially inner surface of the link segment to provide a gap between the inlet flange and the link segment to accommodate the expansion rate of the burner seal retainer.

In some embodiments, the mount plate of each retainer half-ring is welded directly to the dome panel to couple the burner seal to the dome panel in the fixed axial position.

In some embodiments, the combustor further includes a retainer bracket including an annular mount ring coupled to the dome panel and a retention panel engaged with the mount plate of each retainer half-ring to couple the burner seal retainer to the dome panel.

In some embodiments, the inlet flange includes an annular ring segment and a plurality of castellation tabs spaced radially from the annular ring segment and the burner seal retainer includes a plurality of castellation tabs opposite the castellation tabs of the inlet flange so that the inlet flange and the burner seal retainer provide a cam lock when the burner seal is inserted through the heat-shield aperture and the fuel nozzle aperture and rotated relative to the burner seal retainer so that the that the castellation tabs of the burner seal are aligned with the castellation tabs of the burner seal retainer.

In some embodiments, the heat shield includes a shield panel and a locating post arranged to extend axially forward from the shield panel and into a post-receiving space formed in the dome panel to block movement of the heat shield relative to the dome panel.

According to another aspect of the present disclosure, a combustor for use in a gas turbine engine includes a combustor shell, a heat shield, and a burner seal. The combustor shell includes an outer annular wall that extends circumferentially around a central reference axis. The combustor shell may further include an inner annular wall arranged radially inward from the outer annular wall to provide the interior combustion space between the outer annular wall and the inner annular wall. The combustor shell may further include a dome panel coupled to axially-forward ends of the outer annular wall and the inner annular wall. The dome panel may be formed to include a plurality of fuel nozzle apertures spaced circumferentially around the central reference axis.

In some embodiments, the heat shield includes ceramic matrix composite materials and is configured to shield a portion of the dome panel from the interior combustion space. The heat shield may be formed to include a heat-shield aperture.

In some embodiments, the burner seal includes ceramic matrix composite materials. The burner seal may be arranged to extend through one of the fuel nozzle apertures included in the plurality of fuel nozzle apertures and the heat-shield aperture along a burner seal axis.

In some embodiments, the burner seal is sized relative to the dome panel to retain itself to the dome panel when the burner seal is fully installed. In some embodiments, the burner seal is floating to allow movement of the burner seal radially and circumferentially relative to the dome panel to accommodate thermal growth of the dome panel at an expansion rate not equal to an expansion rate of the burner seal.

In some embodiments, the heat shield aperture and the fuel nozzle aperture each have an oval shape that match and the burner seal includes an inlet flange with an outer perimeter that matches the heat shield aperture and the fuel nozzle aperture.

In some embodiments, the burner seal is configured to be rotated after the inlet flange is inserted through the heat shield aperture and the fuel nozzle aperture so that a portion of the inlet flange engages a forward surface of the dome panel to block movement of the burner seal axially aft along the burner seal axis.

In some embodiments, the burner seal further includes a burner seal body with an inlet end and an outlet end spaced axially from the inlet end and a retainer flange spaced axially between the inlet end and outlet end that extends radially outward from the burner seal body relative to the burner seal axis and the retainer flange engages the an aft surface of the heat shield to retain the heat shield to the aft surface after the burner seal is fully installed.

In some embodiments, the heat shield includes a shield panel and a locating post arranged to extend axially forward from the shield panel and into a post-receiving space formed in the dome panel to block movement of the heat shield relative to the dome panel.

According to another aspect of the present disclosure, a method of retaining a heat shield to a dome panel in a combustor of a gas turbine engine includes providing a combustor comprising metallic materials and formed to define an interior combustion space. The combustor may include a dome panel that is formed to include at least one fuel nozzle aperture.

In some embodiments, the method further includes providing a heat shield comprising ceramic matrix composite materials, the heat shield formed to include a heat shield aperture at least partially aligned with the at least one fuel nozzle aperture.

In some embodiments, the method further includes inserting a burner seal through the heat shield aperture and the fuel nozzle aperture from an aft side of the dome panel, the burner seal comprising ceramic matrix composite materials.

In some embodiments, the method further includes retaining the heat shield to an aft surface of the dome panel with the burner seal. In some embodiments, the method further includes retaining the heat shield to an aft surface of the dome panel with only the burner seal.

In some embodiments, the burner seal includes a burner seal body that extends circumferentially around a burner seal axis and has an inlet end and an outlet end spaced axially from the inlet end, an inlet flange at the inlet end that extends radially outward from the burner seal body relative to the burner seal axis, and a retainer flange spaced axially between the inlet end and outlet end that extends radially outward from the burner seal body relative to the burner seal axis and the step of retaining the heat shield includes engaging the heat shield with the retainer flange.

In some embodiments, the step of retaining the heat shield includes retaining the inlet flange to a forward surface of the dome panel so that the inlet flange and the retainer flange clamp the heat shield to the dome panel between the inlet flange and the retainer flange.

In some embodiments, the step of retaining the inlet flange includes enclosing the inlet flange with a first retainer half-ring formed to include a first semi-circular channel and a second retainer half-ring formed to include a second semi-circular channel, the inlet flange being received in the first and second semi-circular channels when the burner seal retainer is installed on the burner seal and the first and second retainer half rings engaged with the forward surface of the dome panel to block movement of the burner seal axially aft through the fuel nozzle aperture.

These and other features of the present disclosure will become more apparent from the following description of the illustrative embodiments.

BRIEF DESCRIPTION OF THE DRAWINGS

FIG. 1 is a perspective cut-away view of a gas turbine engine showing that the gas turbine engine includes compressor, a combustor, and a turbine;

FIG. 2 is a perspective cut away view of the combustor from FIG. 1 showing that the combustor includes a combustor shell defining an interior combustion space, a heat shield arranged in the interior combustion space, and a plurality of burner seals arranged to extend through corresponding fuel nozzle apertures formed in the combustor shell;

FIG. 3 is an enlarged perspective cutaway view of a portion of the combustor from FIG. 2 showing that the burner seal includes an inlet flange coupled to a burner seal retainer and a retainer flange engaged with the heat shield to retain the heat shield against the combustor shell;

DETAILED DESCRIPTION OF THE DRAWINGS

Figure 4:
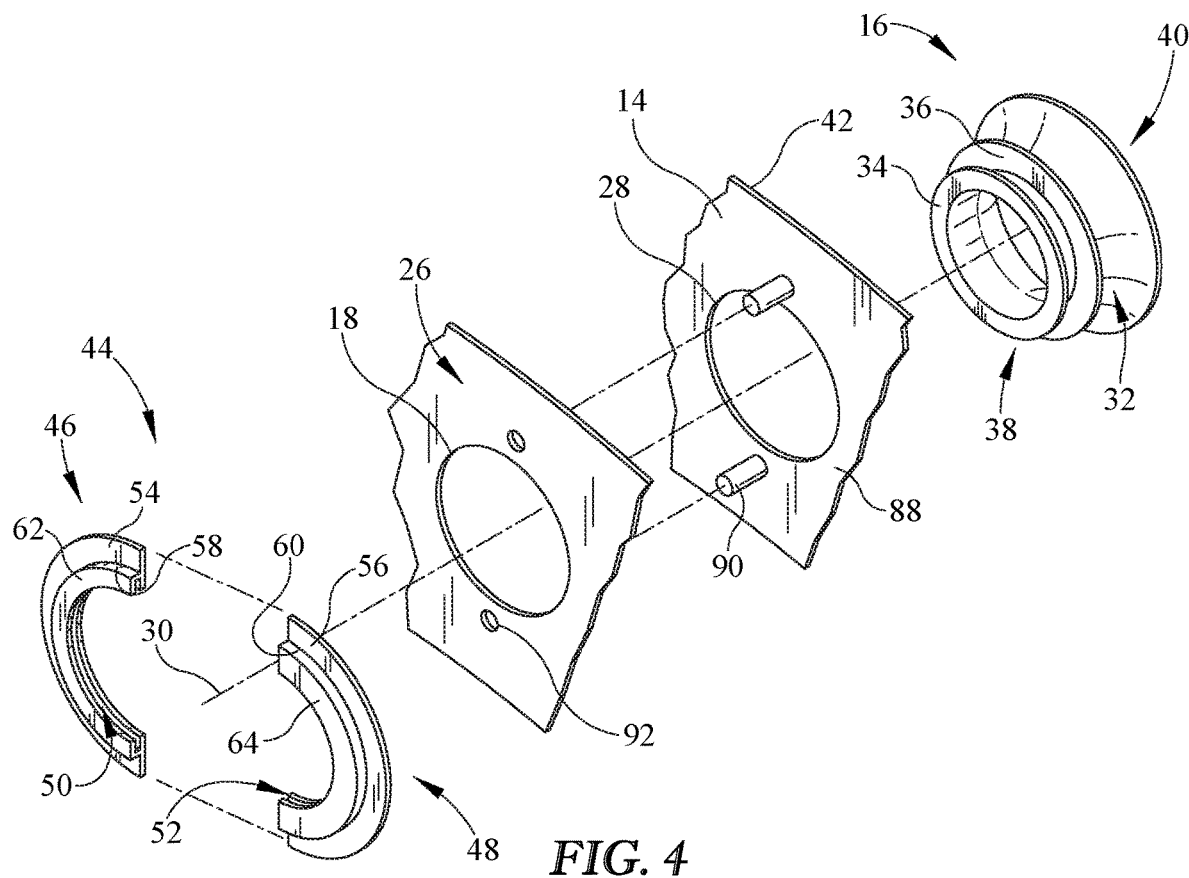
FIG. 4 is an exploded assembly view of portions of the combustor from FIGS. 1-3 suggesting that the burner seal is configured to be inserted through apertures formed in the heat shield and the combustor shell from the aft.

For the purposes of promoting an understanding of the principles of the disclosure, reference will now be made to a number of illustrative embodiments illustrated in the drawings and specific language will be used to describe the same.

The arrangement of an illustrative combustor 10 in a gas turbine engine 110 is shown in FIG. 1. The gas turbine engine 110 includes a fan 120, a compressor 130, the combustor 10, and a turbine 140. The fan 120 is driven by the turbine 140. The compressor 130 compresses and delivers air to the combustor 10. The combustor 10 mixes fuel with the compressed air received from the compressor 130 and ignites the fuel. The hot, high pressure products of the combustion reaction in the combustor 10 are directed into the turbine 140 and the turbine 140 extracts work to drive the compressor 130 and the fan 120.

The combustor 10 is an annular combustor and includes a combustor shell 12, a heat shield 14, and a plurality of burner seals 16 that extend through corresponding fuel nozzle apertures 18 formed in the combustor shell 12 as shown in FIGS. 2 and 3. The combustor shell 12 is adapted to be mounted in the gas turbine engine 110 circumferentially around a central reference axis 15 and defines an interior combustion space 20. The heat shield 14 is coupled to the combustor shell 12 and protects a portion of the combustor shell 12 from heat generated by the combustion reaction in the interior combustion space 20. Each burner seal 16 provides an inlet port for a fuel nozzle (not shown) used to spray fuel for the combustion reaction in the interior combustion space 20.

The combustor shell 12 is made from metallic materials while the heat shield 14 and each burner seal 16 is made from ceramic matrix composite (CMC) materials as shown in FIG. 3. Each burner seal 16 is allowed to float relative to the combustor shell 12 to accommodate different rates of thermal expansion between the combustor shell 12 and the burner seals 16. Each burner seal is also configured to retain the heat shield 14 to the combustor shell 12 when fully installed without fixing the heat shield 14 to the combustor shell using other means such as fasteners, welding, brazing, or the like. In this way, binding stresses, which may be formed in the CMC materials due to the different rates of thermal expansion, are avoided to increase the durability of the heat shield 14 and the burner seals 16 while protecting the combustor shell 12 from the combustion reaction.

The combustor shell 12 includes an outer annular wall 22, an inner annular wall 24, and a dome panel 26 (also called a meter panel) coupled to axially-forward ends of the outer wall 22 and the inner wall 24 as shown in FIGS. 2 and 3. The outer wall 22 extends circumferentially around the central reference axis 15. The inner wall 14 is arranged radially inward from the outer wall 22 to provide the interior combustion space 20 between the outer wall 22 and the inner wall 24. Each of the fuel nozzle apertures 18 are formed in the dome panel 26 and are spaced circumferentially around the central reference axis 15.

The heat shield 14 is configured to shield at least a portion of the dome panel 26 from the combustion reaction in the interior combustion space 20. The heat shield 14 is formed to include a heat-shield aperture 28. The heat shield aperture 28 is aligned with a corresponding fuel nozzle aperture 18. Both the fuel nozzle aperture 18 and the heat shield aperture 28 are sized so that a respective burner seal 16 can be inserted therethrough from an aft side of the heat shield 14 and the dome panel 26 along a burner seal axis 30.

Although the combustor includes a plurality of burner seals 16, each burner seal 16 is identical in the illustrative embodiment. Accordingly, only one burner seal 16 is referred to below. The burner seal 16 is arranged circumferentially around the burner seal axis 30 and includes a burner seal body 32, an inlet flange 34, and a retainer flange 36 as shown in FIGS. 3 and 4. The burner seal body 32 has an inlet end 38 and an outlet end 40 spaced axially from the inlet end 38 relative to the burner seal axis 30. The inlet flange 34 is located at the inlet end 38 and extends radially outward from the burner seal body 32 relative to the burner seal axis 30. The retainer flange 34 is spaced axially between the inlet end 38 and outlet end 40 and extends radially outward from the burner seal body 32 relative to the burner seal axis 30. The retainer flange 34 engages an aft surface 42 of the heat shield 14 when the burner seal 16 is fully installed to retain the heat shield 14 in position relative to the dome panel 26.

Figure 5:
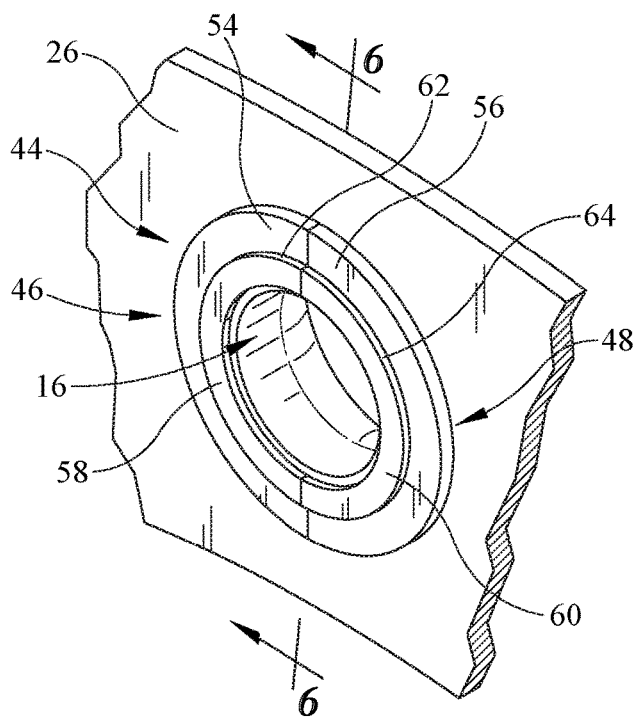
FIG. 5 is a partially exploded view of the portions of the combustor shown in FIG. 4 with the burner seal retainer installed around the inlet flange of the burner seal to retain the burner seal to the dome panel.

In the illustrative embodiment, the combustor 10 further includes a burner seal retainer 44 that is configured to couple the burner seal 16 to the dome panel 26 as shown in FIGS. 3 and 5. The burner seal retainer 44 is made from metallic materials and engages the inlet flange 34 of the burner seal on an axially forward side of the dome panel 26. The burner seal retainer 44 couples the burner seal 16 to the dome panel 26 in a fixed axial position relative to the burner seal axis 30. The burner seal 16 is sized relative to the dome panel 26 and burner seal retainer 44 such that the burner seal 16 is floating. This allows movement of the burner seal 16 radially and circumferentially relative to the dome panel 26 and the burner seal retainer 44 as the dome panel 26 and the burner seal retainer 44 grow thermally at an expansion rate not equal to an expansion rate of the burner seal 16.

The burner seal retainer 44 includes a first retainer half-ring 46 and a second retainer half-ring 48 as shown in FIGS. 4 and 5. The first retainer half-ring 46 is formed to include a first semi-circular channel 50 and the second retainer half-ring 48 is formed to include a second semi-circular channel 52. Together, the first and second semi-circular channels 50, 52 form a continuous annular channel that receives the inlet flange 34 when the burner seal retainer 44 is installed on the burner seal 16.

Figure 6:
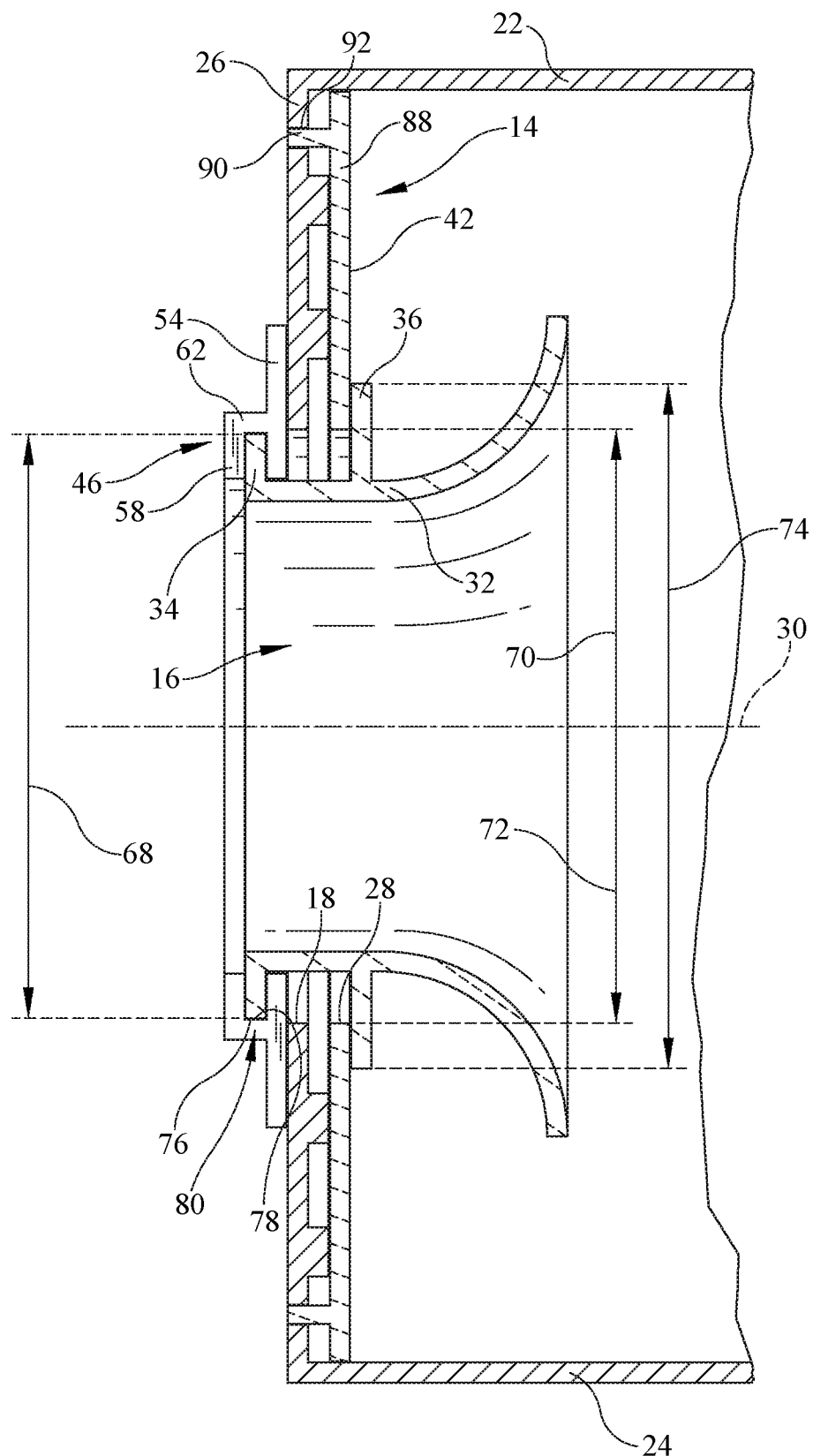
FIG. 6 is a cross sectional view of the combustor taken along line 6-6 in FIG. 5 with dimensions showing that the retainer flange has a diameter that is larger than a diameter of the apertures formed in the heat shield and the combustor shell to engage and retain the heat shield when the burner seal and the burner seal retainer are fully installed.

Each retainer half-ring 46, 48 includes a mount plate 54, 56, a link segment 58, 60, and a retainer plate 62, 64 as shown in FIG. 4-6. The mount plate 54, 56 is coupled to an axially forward surface 66 of the dome panel 26 when the burner seal retainer 44 is fully installed. The link segment 58, 60 is coupled to the mount plate 54, 56 and is arranged to extend axially forward from the mount plate 54, 56. The retainer plate 62, 64 is coupled to the link segment 58, 60 and is spaced apart from the mount plate 54, 56 to provide the first and second semi-circular channels 50, 52 axially between the mount plate 54, 56 and the retainer plate 62, 64.

The inlet flange 34 has a first diameter 68 and the fuel nozzle aperture 18 has a second diameter 70 as shown in FIG. 6. The second diameter 70 is greater than the first diameter 68 so that the burner seal 16 can be inserted through the fuel nozzle aperture 18 from the aft side of the dome panel 26. Similarly, the heat-shield aperture 28 has a third diameter 72 that is greater than the first diameter 68 of the inlet flange 34 so that the burner seal 16 can be inserted through the heat shield aperture 28 from the aft side. The retainer flange 36 has a fourth diameter 74 that is greater than the third diameter 72 so that the retainer flange 36 engages the aft surface 42 of the heat shield 14. Once fully inserted, the inlet flange 34 protrudes axially forward past the dome panel 26 and the first and second retainer half-rings 46, 48 are positioned around the inlet flange 34 to enclose the inlet flange 34. In some embodiments, the inlet flange 34 has a distal end 76 spaced apart from a radially inner surface 78 of the link segment 58, 60. This provides a gap 80 between the inlet flange 34 and the link segment 58, 60 to accommodate the different expansion rate of the burner seal retainer 44. The mount plate 54, 56 of each retainer half-ring 46, 48 may be joined directly to the dome panel 26 by welding, brazing, soldering, or any other suitable metal joining process to couple the burner seal 16 to the dome panel 26 in the fixed axial position.

Once fully installed, the retainer flange 36 and the burner seal retainer 44 cooperate to block axial movement of the burner seal 16 relative to the dome panel 26 along the burner seal axis 30 as shown in FIG. 6. Similarly, axial movement of the heat shield 14 relative to the dome panel 26 is also blocked. All of this is done without any holes being drilled into the heat shield 14 or the burner seal 16 and subsequently retained to the dome panel 26 with fasteners or other means that could affect the strength or durability of the heat shield 14 and/or the burner seal 16.

Figure 7:
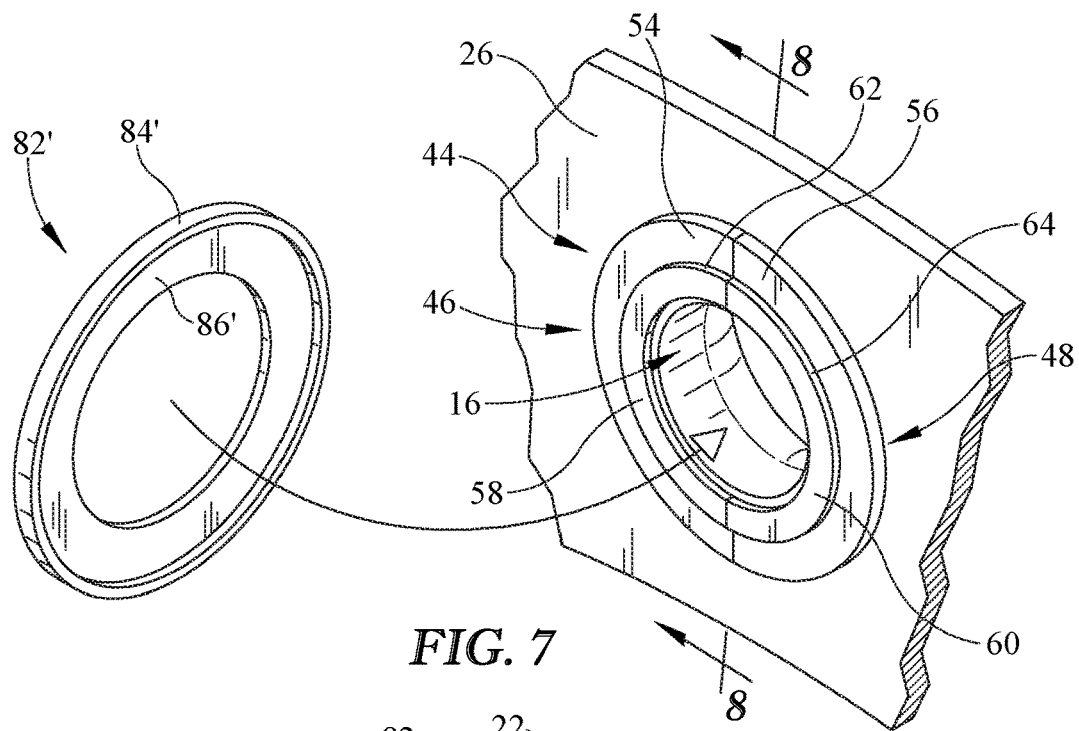
FIG. 7 a partially exploded view of portions of another combustor with a retainer bracket uninstalled from the combustor shell.
Figure 8:
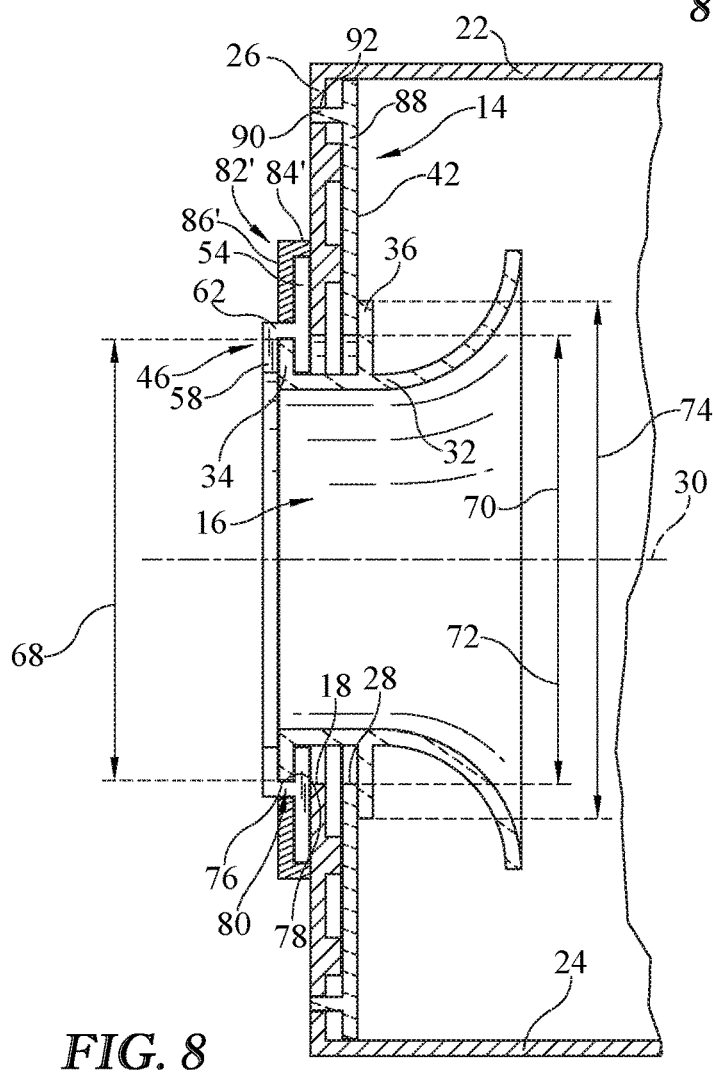
FIG. 8 a cross sectional view of the combustor taken along line 8-8 in FIG. 7 with the retainer bracket installed and engaged with the burner seal retainer and the dome panel to retain the burner seal retainer to the dome panel.

In the illustrative embodiment, the combustor 10 may further include an optional retainer bracket 82' configured to retain the first and second retainer half-rings 46, 48 together after they enclose the inlet flange 34 as shown in FIGS. 7 and 8. The retainer bracket 82' is made from metallic materials and includes a mount ring 84' and a retention panel 86'. The mount ring 84' is coupled to the dome panel 26' by welding, brazing, or another suitable metal joining process. The retention panel 86' is engaged with the mount plate 54, 56 of each retainer half-ring 46, 48 to couple the burner seal retainer 44 to the dome panel 26.

In the illustrative embodiment, the heat shield 14 includes a shield panel 88 and a locating post 90 as shown in FIGS. 4 and 6. The shield panel 88 extends partway around the central reference axis 15 radially between the outer wall 22 and the inner wall 24. The locating post 90 is arranged to extend axially forward from the shield panel 88 and into a post-receiving space 92 formed in the dome panel 26 to block movement of the heat shield 14 relative to the dome panel 26. Illustratively, the heat shield 14 includes a pair of locating posts 90 with one located on each radial side of the heat shield aperture 28, but any suitable number of locating posts 90 may be included and located in other areas.

Figure 9:
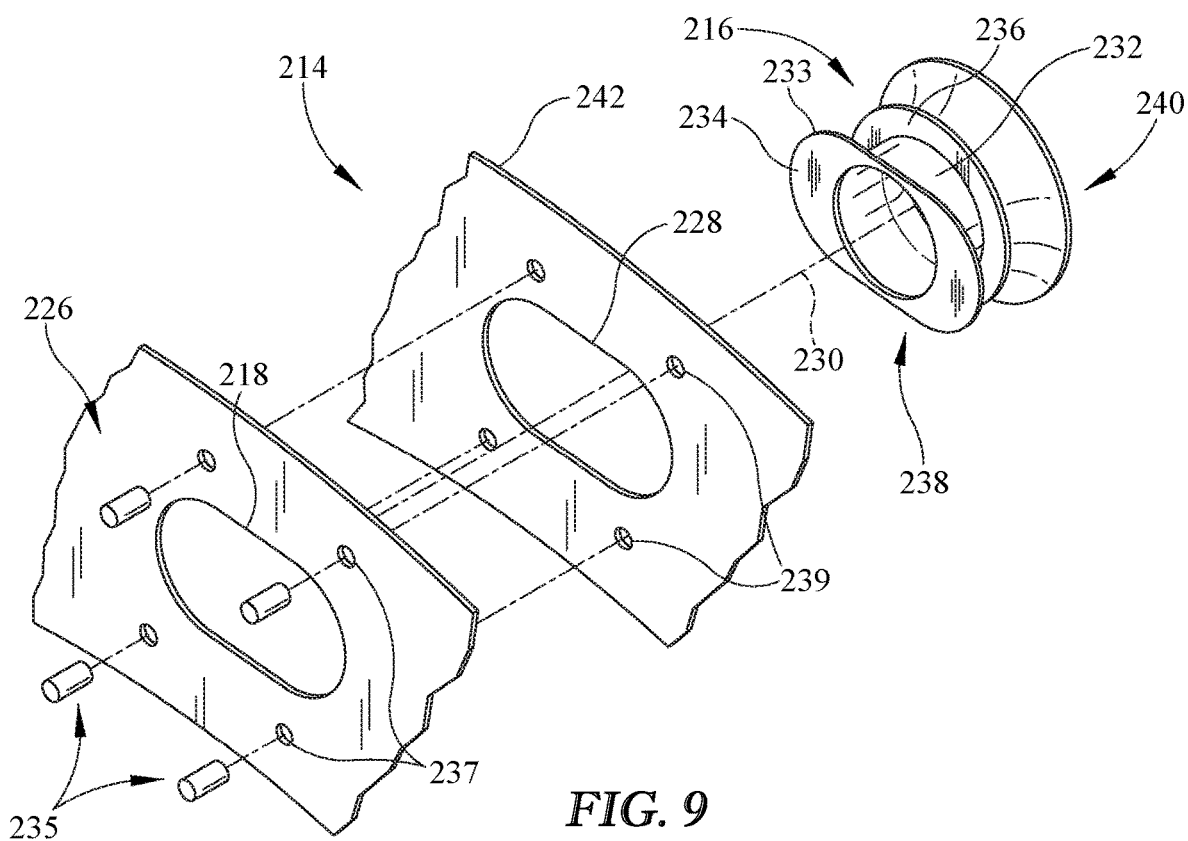
FIG. 9 is an exploded assembly view of portions of another combustor including a burner seal with an inlet flange having an oval shape, a heat shield with an aperture that corresponds with the inlet flange, and a dome panel with an aperture that corresponds with the aperture in the heat shield and the inlet flange.
Figure 10:
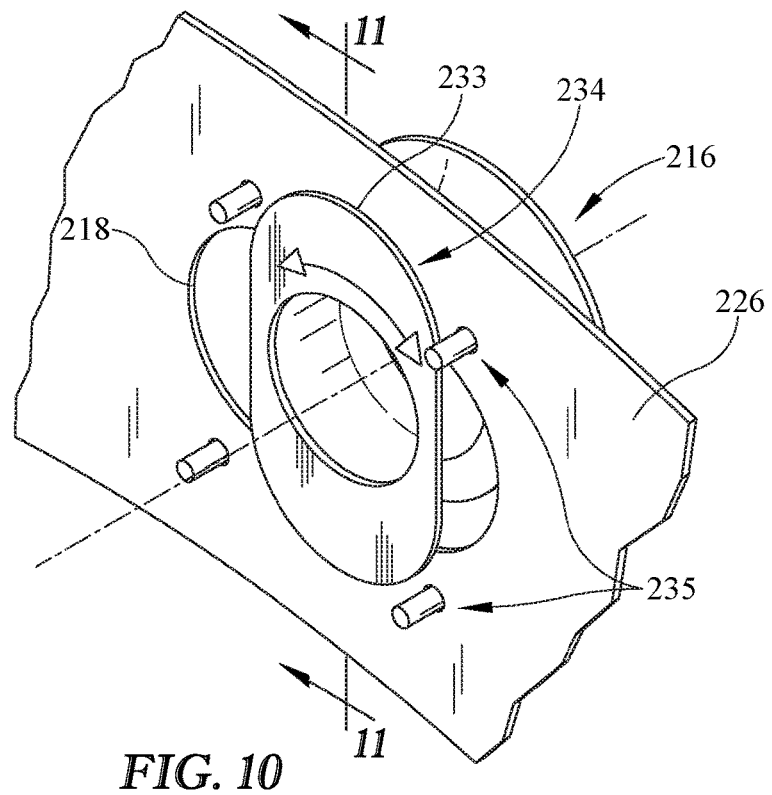
FIG. 10 is a perspective view of the portions of the combustor shown in FIG. 7 with the inlet flange of the burner seal inserted through the apertures formed in the heat shield and the dome panel and rotated 90 degrees so that the inlet flange of the burner seal blocks axial movement of the burner seal relative to the dome panel.
Figure 11:
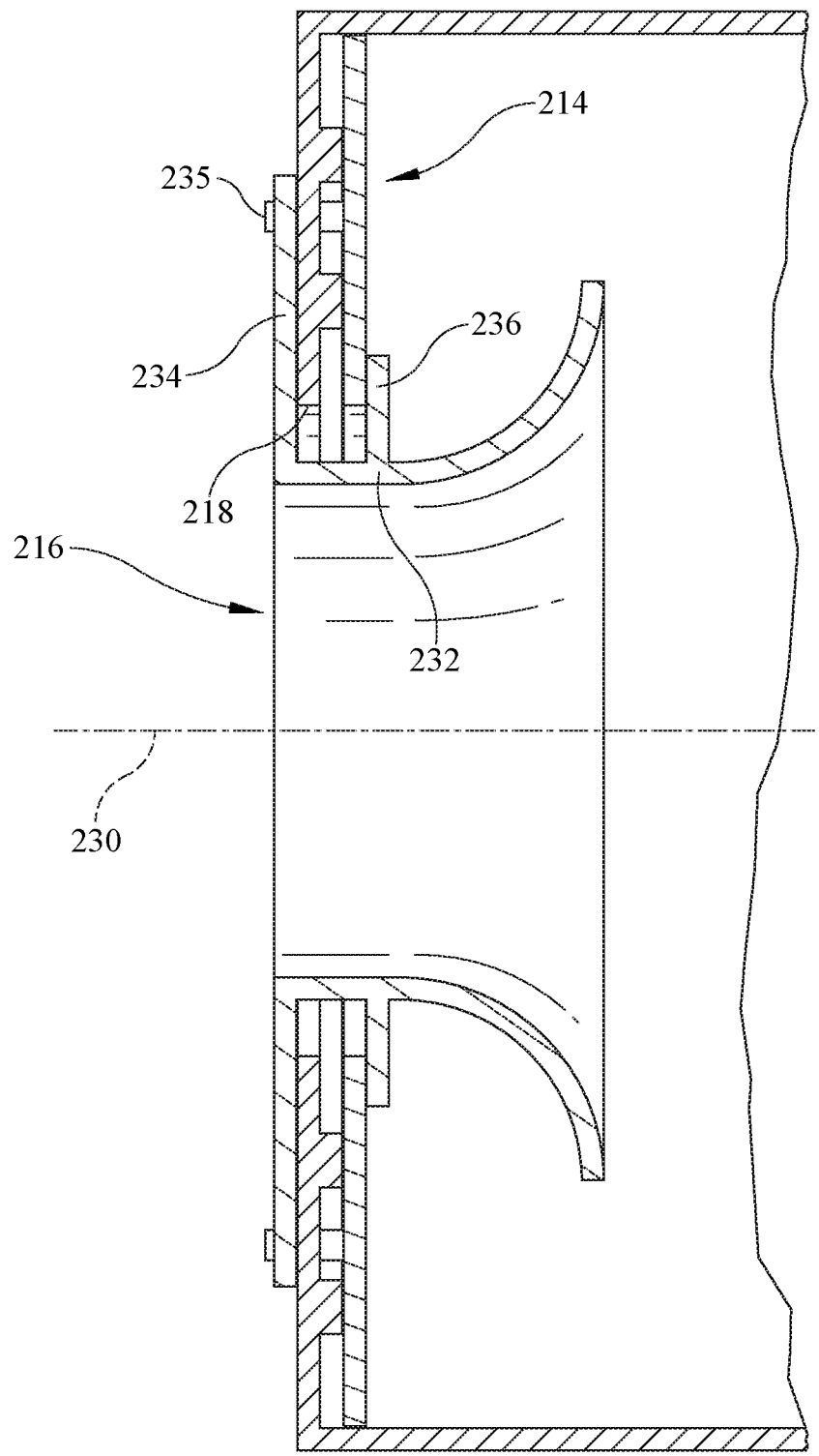
FIG. 11 is a cross sectional view of the combustor taken along line 11-11 in FIG. 10 showing the burner seal retaining the heat shield against the dome panel with a retainer flange to block axial movement of the heat shield relative to the dome panel.

In some embodiments, the burner seal retainer 44 may be omitted. Another embodiment of a burner seal 216 that is configured to couple to a dome panel 226 of a combustor without a burner seal retainer is shown in FIGS. 9-11. The burner seal 216 is substantially similar to burner seal 16. As such, similar reference numbers in the 200 series are used to describe similar features between burner seal 16 and burner seal 216. Accordingly, the disclosure above related to burner seal 16 is incorporated herein for burner seal 216 and differences between burner seal 16 and burner seal 216 are described below.

The burner seal 216 is sized relative to the dome panel 226 to retain itself to the dome panel 226 when the burner seal 216 is fully installed. The burner seal 216 includes a burner seal body 232, an inlet flange 234, and a retainer flange 236. The burner seal body 232 has an inlet end 238 and an outlet end 240 spaced axially from the inlet end 238 relative to a burner seal axis 230. The inlet flange 234 is located at the inlet end 238 and extends radially outward from the burner seal body 232 relative to the burner seal axis 230. The inlet flange 232 has an outer perimeter 233 with an oval shape. The retainer flange 234 is spaced axially between the inlet end 238 and outlet end 240 and extends radially outward from the burner seal body 232 relative to the burner seal axis 230.

The retainer flange 236 engages an aft surface 242 of a heat shield 214 when the burner seal 216 is fully installed to retain the heat shield 214 in position relative to the dome panel 226 as suggested in FIG. 9 and shown in FIG. 11. The heat shield 214 and the dome panel 226 are substantially similar to heat shield 14 and dome panel 26 except for the apertures formed therein. The dome panel 226 is formed to include a fuel nozzle aperture 218 with an oval shape and the heat shield 214 is formed to include a heat shield aperture 228 with an oval shape that is aligned with the fuel nozzle aperture 218.

The fuel nozzle aperture 218 and the heat shield aperture 228 match the oval shape of the perimeter 233 of the inlet flange 234 of the burner seal 216 as shown in FIG. 9. To mount the burner seal 216 to the dome panel 226, the perimeter 233 of the inlet flange 234 is oriented so that it matches the fuel nozzle aperture 218 and the heat shield aperture 228. The perimeter 233 is sized slightly smaller than the fuel nozzle aperture 218 and the heat shield aperture 228 so that the burner seal 216 can be inserted therethrough. Once inserted through the fuel nozzle aperture 218 and the heat shield aperture 228, the burner seal 216 is rotated about burner seal axis 230 so that the fuel nozzle aperture 218 and the heat shield aperture 228 are mismatched relative the inlet flange 234. In the position shown in FIG. 8, the inlet flange 234 blocks axial movement of the burner seal 216. Anti-rotation pins 235 (i.e. fasteners) may be provided and received in corresponding openings 237 in the dome panel 226 on each circumferential side of the inlet flange 234 to block the burner seal 216 from rotating about the burner seal axis 230. Additional openings 239 may be formed in the heat shield 214 to receive the pins 235 and locate the heat shield 214 relative to the dome panel 226.

Figure 12:
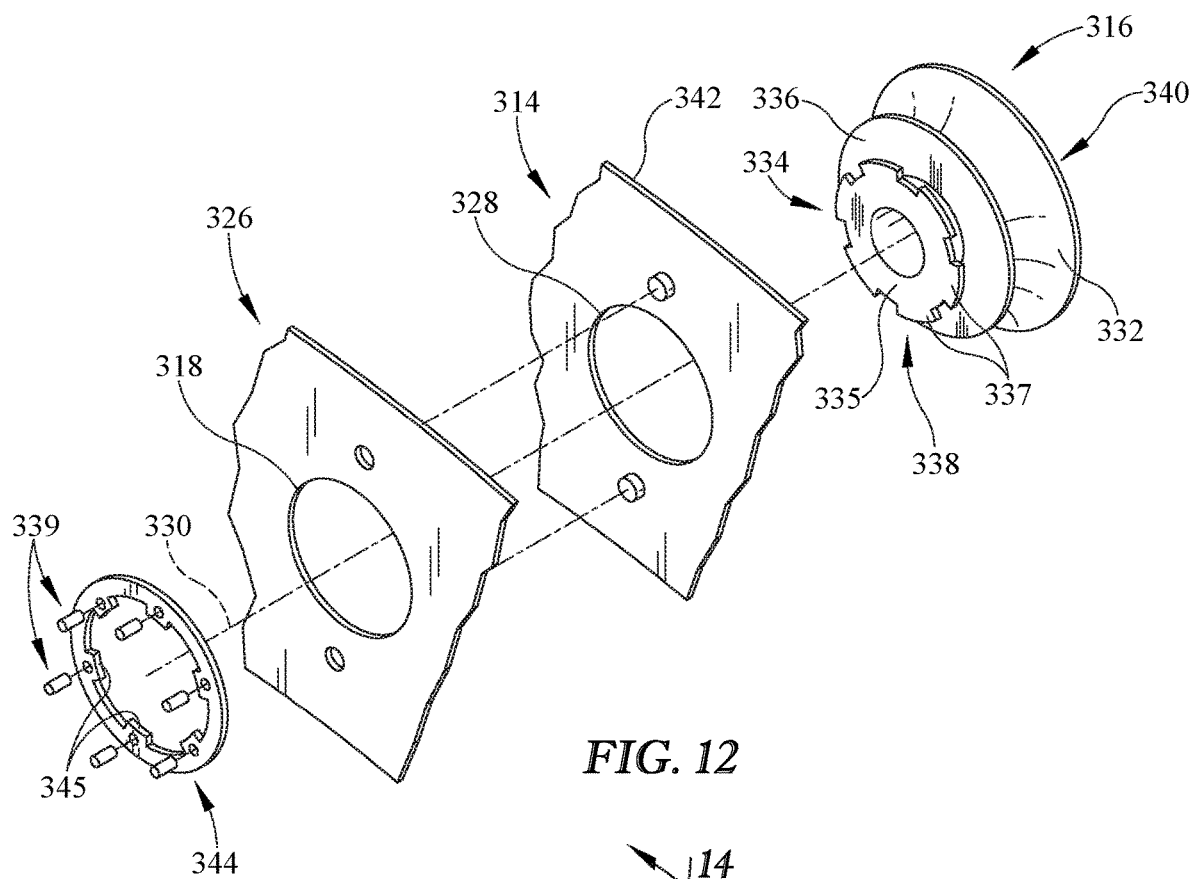
FIG. 12 is an exploded assembly view of portions of another combustor including a burner seal with an inlet flange with a plurality of castellation tabs and a burner seal retainer with a plurality of castellation tabs and suggesting that the burner seal is configured to couple with the burner seal retainer.
Figure 13:
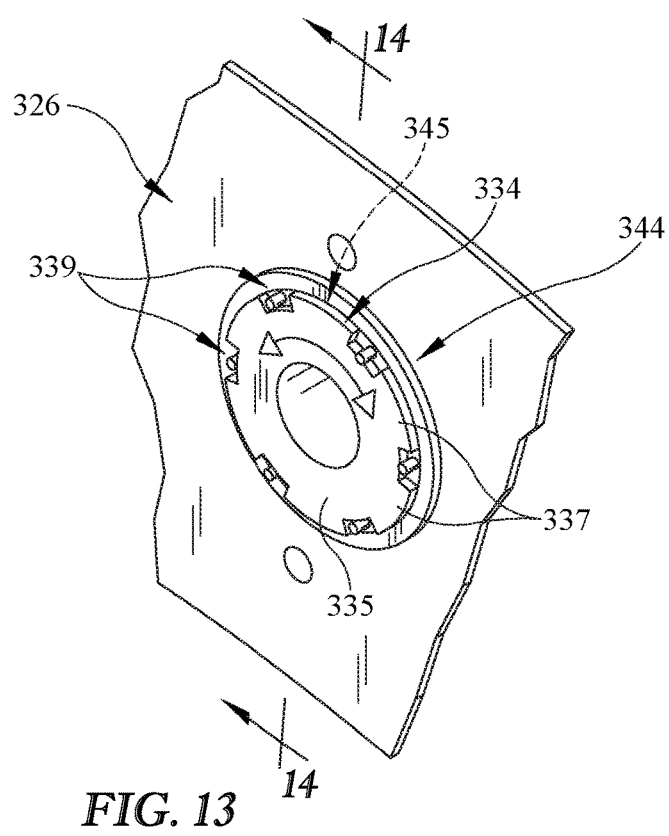
FIG. 13 is a perspective view of the portions of the combustor shown in FIG. 12 with the inlet flange of the burner seal inserted through gap formed between neighboring castellation tabs on the burner seal retainer and rotated so that the castellation tabs are aligned to block axial movement of the burner seal relative to the dome panel.
Figure 14:
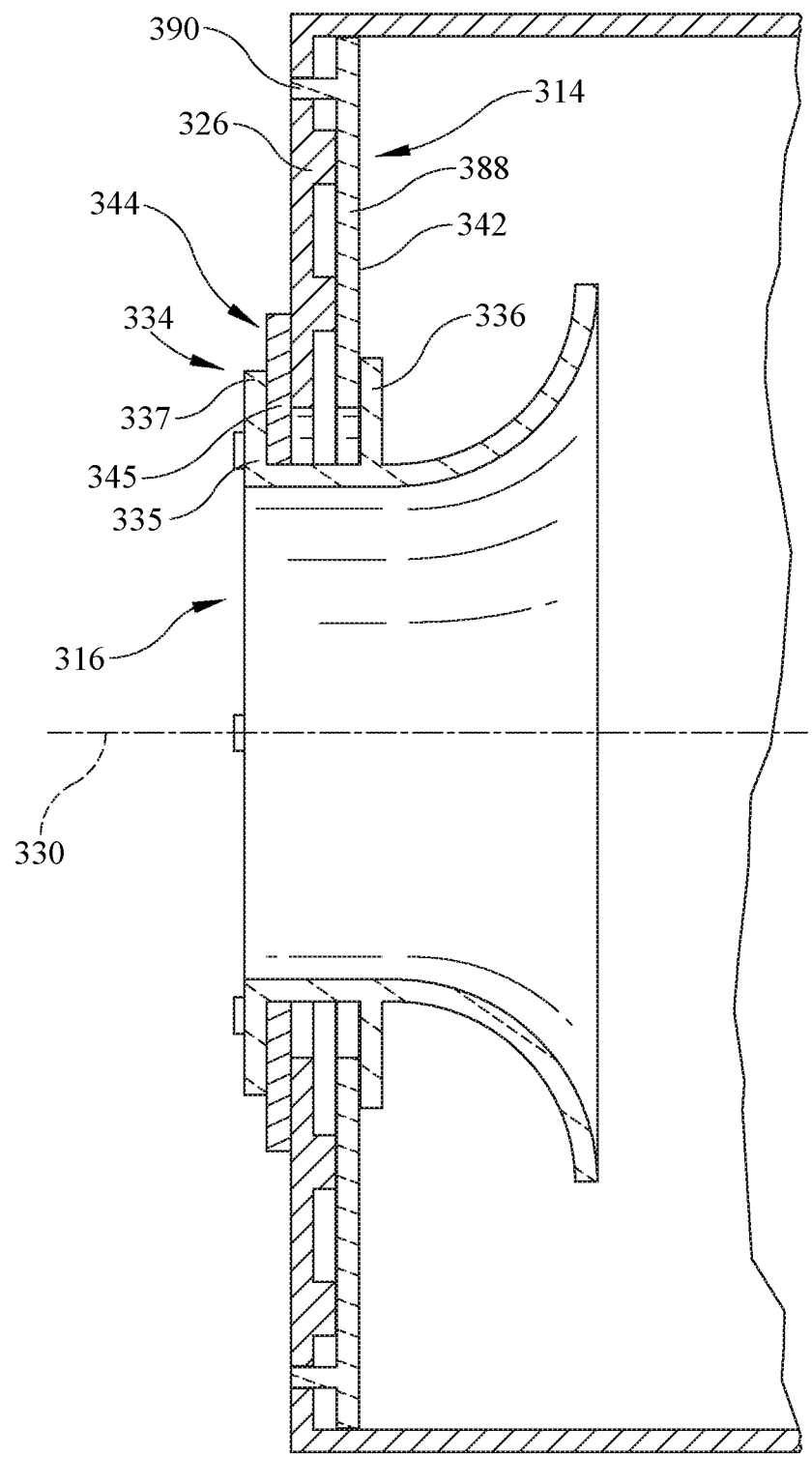
FIG. 14 is a cross sectional view of the combustor taken along line 14-14 in FIG. 13 showing the burner seal retaining the heat shield against the dome panel with a retainer flange to block axial movement of the heat shield relative to the dome panel.

In some embodiments, the inlet flange of the burner seal may have another shape that is used to couple the burner seal to the dome panel. Another embodiment of a burner seal 316 with a differently shaped inlet flange 334 is shown in FIGS. 12-14. The burner seal 316 The burner seal 316 is substantially similar to burner seals 16, 216. As such, similar reference numbers in the 300 series are used to describe similar features between burner seals 16, 216 and burner seal 316. Accordingly, the disclosure above related to burner seals 16, 216 is incorporated herein for burner seal 316 and differences between burner seals 16, 216 and burner seal 316 are described below.

The burner seal 316 includes a burner seal body 332, an inlet flange 334, and a retainer flange 336. The burner seal body 332 has an inlet end 338 and an outlet end 340 spaced axially from the inlet end 338 relative to a burner seal axis 330. The inlet flange 334 is located at the inlet end 338 and extends radially outward from the burner seal body 332 relative to the burner seal axis 330. The retainer flange 334 is spaced axially between the inlet end 338 and outlet end 340 and extends radially outward from the burner seal body 332 relative to the burner seal axis 330. The retainer flange 336 engages an aft surface 342 of a heat shield 314 when the burner seal 316 is fully installed to retain the heat shield 314 in position relative to dome panel 326

The inlet flange 334 includes an annular ring segment 335 and a plurality of castellation tabs 337 spaced radially from the annular ring segment 335. In one embodiment, a burner seal retainer 344 with a plurality of castellation tabs 345 is provided. The castellation tabs 345 are formed opposite the castellation tabs 337 of the inlet flange 334. The inlet flange 334 and the burner seal retainer 344 provide a cam lock when the burner seal 316 is inserted through a heat-shield aperture 328 and a fuel nozzle aperture 318 and rotated relative to the burner seal retainer 344. In the position shown in FIG. 13, the castellation tabs 337 of the burner seal 316 are aligned with the castellation tabs 345 of the burner seal retainer 344 to form interlocking features that block axial movement of the burner seal 316 relative to the dome panel 326. Anti-rotation pins 339 may be provided and received in corresponding openings in the dome panel 326 between neighboring tabs 337 to block the burner seal 316 from rotating about the burner seal axis 330.

In other embodiments, the burner seal retainer 344 may be omitted and the dome panel 326 may be formed with a fuel nozzle aperture that matches the shape of the inlet flange 334. The inlet flange 334 may then be inserted into the corresponding fuel nozzle aperture and rotated as described above so that the inlet flange 334 and the fuel nozzle aperture are mismatched to block axial movement of the burner seal 316 relative to the dome panel 326.

The ceramic matrix composite materials in the illustrative embodiments described herein may comprise silicon carbide fibers suspended in a silicon carbide matrix, however, any suitable ceramic matrix composite composition may be used. The heat shields and the burner seals are made from silicon carbide fiber preforms that are infiltrated with ceramic matrix material. The fiber preforms may be a two-dimensional ply preform or a three-dimensionally woven or braided preform. Prior to infiltration, the preforms may be molded into a desired shape. Once molded into the desired shape, the fiber preforms are infiltrated with ceramic matrix material by chemical vapor infiltration to solidify and/or densify the fibers and form the CMC component. The fiber preforms may be also be processed through slurry infiltration, melt infiltration and/or polymer infiltration and pyrolysis. Once densified, the finished ceramic matrix composite component may be machined to finalize the desired shape.

In some embodiments, the combustor in a gas turbine operates at extremely high temperatures and, thus, challenges the capabilities of metallic alloys that are used to form the combustion chamber. SiC—SiC CMC offers a higher temperature option to deal with this extreme environment. Two locations that may benefit from such a material change are the burner seal and heat shield. The fuel nozzle inserts into the burner seal. The seal is fixed axially but is allowed to float in the radial and circumferential directions so as not to over constrain the fuel nozzle. One consideration to implementation of a CMC burner seal work is to figure out how to hold it without allowing for too much movement due to the coefficient of thermal expansion mismatch relative to metallic components. The heat shield may need to be at least somewhat fixed due to the cooling air that flows around the edges between the heat shield and the combustor liners.

In some embodiments, a funnel shaped burner seal (or other shape designated by aero considerations) that is inserted through the heat shield and dome panel from the aft face forward as suggested in FIGS. 1-10. The hole in the heat shield and dome panel being sized to allow the burner seal inserted from the aft and the burner seal having an integral retaining plate that is larger than the holes in the heat shield and dome panel. Once inserted, retaining half rings (that are larger than the hole in the dome panel) are placed around the burner seal trapping it from being able to be removed. The retaining rings would then be retained axially by a plurality of metal brackets being welded to the dome panel (anti-rotation features would be required in both the burner seal and in the retaining rings. The retaining plate is used to hold the heat shield in place relative to the dome panel. Additionally, the heat shield has positioning features that limit/minimize movement of the heat shield relative to the dome panel. In some embodiments, the retaining half rings to be welded directly to the dome panel.

In some embodiments, the forward end/flange of the burner seal is oval/elliptical as suggested in FIGS. 9-11. The hole in the heat shield and dome panel are also oval/elliptical but large enough for the burner seal flange to pass through. The burner seal would be inserted from the aft side of the heat shield and then rotated 90 degrees to lock the system together. Two bolt/washer assemblies could then be bolted to the front side of the dome panel to anti-rotate the burner seal.

In some embodiments, the retaining rings include castellated features that engage with equivalent but negative features in the dome panel to form a cam-lock arrangement as suggested in FIGS. 12-14. An anti-rotation pin would then be affixed to keep the cam-lock feature from coming undone. A snap ring or retaining rings could be used to ensure the clam shell brackets stay together. (assuming the dome panel surfaces will not be tight on the brackets to keep them together).

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A combustor for use in a gas turbine engine, the combustor comprising
    a combustor shell comprising metallic materials adapted to be mounted in the gas turbine engine and formed to define an interior combustion space, the combustor shell including an outer annular wall that extends circumferentially around a central reference axis, an inner annular wall arranged radially inward from the outer annular wall to provide the interior combustion space between the outer annular wall and the inner annular wall, and a dome panel coupled to axially-forward ends of the outer annular wall and the inner annular wall, the dome panel being formed to include a plurality of fuel nozzle apertures spaced circumferentially around the central reference axis,
    a heat shield comprising ceramic matrix composite materials and configured to shield a portion of the dome panel from the interior combustion space, the heat shield being formed to include a heat-shield aperture,
    a burner seal comprising ceramic matrix composite materials, the burner seal arranged to extend through a fuel nozzle aperture of the plurality of fuel nozzle apertures and the heat-shield aperture along a burner seal axis, and
    a burner seal retainer comprising metallic materials and arranged axially forward of the dome panel in engagement with the burner seal to couple the burner seal to the dome panel in a fixed axial position relative to the burner seal axis, wherein the burner seal is sized relative to the dome panel and the burner seal retainer such that the burner seal is floating to allow movement of the burner seal radially and circumferentially relative to the dome panel and the burner seal retainer as the dome panel and the burner seal retainer grow thermally at an expansion rate not equal to an expansion rate of the burner seal,
    wherein the burner seal includes a burner seal body having an inlet end and an outlet end spaced axially from the inlet end, an inlet flange at the inlet end and that extends radially outward from the burner seal body relative to the burner seal axis from a first end fixed to the inlet end of the burner seal body to a second end spaced apart from the first end, and a retainer flange fixed to the burner seal body and spaced axially between the inlet end and outlet end, the retainer flange extending radially outward from the burner seal body relative to the burner seal axis,
    wherein the inlet flange has a first outer diameter at the second end and the fuel nozzle aperture has a second diameter greater than the first outer diameter so that the burner seal is inserted through the fuel nozzle aperture from an aft side of the dome panel, and
    wherein the heat-shield aperture has a third diameter that is greater than the first outer diameter of the inlet flange and the retainer flange has a fourth outer diameter that is greater than the third diameter so that the retainer flange engages an aft surface of the heat shield to retain the heat shield to the dome panel after the burner seal is inserted through the fuel nozzle aperture and the heat-shield aperture.

2. The combustor of claim 1, wherein the burner seal retainer includes a first retainer half-ring formed to include a first semi-circular channel and a second retainer half-ring, separate from the first retainer half-ring and formed to include a second semi-circular channel, and the inlet flange is received in the first and second semi-circular channels when the burner seal retainer is installed on the burner seal, wherein the burner seal retainer has an inner diameter less than the second diameter of the fuel nozzle aperture and the third diameter of the heat shield aperture.

3. The combustor of claim 2, wherein each retainer half-ring includes a mount plate fixed to an axially forward surface of the dome panel, a link segment fixed to the mount plate and arranged to extend axially forward from the mount plate, and a retainer plate fixed to the link segment and spaced apart from the mount plate to provide the first and second semi-circular channels axially between the mount plate and the retainer plate, the mount plate, the link segment, and the retainer plate being integral with one another.

4. The combustor of claim 3, wherein the inlet flange has a distal end spaced apart from a radially inner surface of the link segment to provide a gap between the inlet flange and the link segment to accommodate the expansion rate of the burner seal retainer.

5. The combustor of claim 3, wherein the mount plate of each retainer half-ring is welded directly to the dome panel to couple the burner seal to the dome panel in the fixed axial position.

6. The combustor of claim 3, further comprising a retainer bracket including an annular mount ring coupled to the dome panel and a retention panel engaged with the mount plate of each retainer half-ring to couple the burner seal retainer to the dome panel.

7. The combustor of claim 1, wherein the heat shield includes a shield panel and a locating post arranged to extend axially forward from the shield panel and into a post-receiving space formed in the dome panel to block movement of the heat shield relative to the dome panel.

8. A method of retaining a heat shield to a dome panel in a combustor of a gas turbine engine, the method comprising:

providing the combustor comprises a combustor shell comprising metallic materials adapted to be mounted in the gas turbine engine and formed to define an interior combustion space, the combustor shell including an outer annular wall that extends circumferentially around a central reference axis, an inner annular wall arranged radially inward from the outer annular wall to provide the interior combustion space between the outer annular wall and the inner annular wall, and the dome panel coupled to axially-forward ends of the outer annular wall and the inner annular wall, the dome panel being formed to include a plurality of fuel nozzle apertures spaced circumferentially around the central reference axis, providing the heat shield comprising ceramic matrix composite materials and configured to shield a portion of the dome panel from the interior combustion space, the heat shield being formed to include a heat shield aperture at least partially aligned with a fuel nozzle aperture of the plurality of fuel nozzle apertures, inserting a burner seal through the heat shield aperture and the fuel nozzle aperture from an aft side of the dome panel, the burner seal comprising ceramic matrix composite materials and the burner seal arranged to extend through the fuel nozzle aperture and the heat shield aperture along a burner seal axis, and retaining the heat shield to an aft surface of the dome panel with the burner seal, wherein the burner seal includes a burner seal body having an inlet end and an outlet end spaced axially from the inlet end, an inlet flange that extends radially outward from the burner seal body relative to the burner seal axis from a first end fixed to the inlet end of the burner seal body to a second end spaced apart from the first end, and a retainer flange fixed to the burner seal body and spaced axially between the inlet end and outlet end, and wherein the step of retaining the heat shield includes contacting the heat shield with the retainer flange to retain the heat shield in contact with the aft side of the dome panel, and wherein the step of retaining the heat shield includes a burner seal retainer comprising metallic materials and arranged axially forward of the dome panel in engagement with the burner seal to couple the burner seal to the dome panel in a fixed axial position relative to the burner seal axis, wherein the burner seal is sized relative to the dome panel and the burner seal retainer such that the burner seal is floating to allow movement of the burner seal radially and circumferentially relative to the dome panel and the burner seal retainer as the dome panel and the burner seal retainer grow thermally at an expansion rate not equal to an expansion rate of the burner seal and retaining the inlet flange to a forward surface of the dome panel so that the inlet flange and the retainer flange cooperate to clamp the heat shield to the dome panel between the inlet flange and the retainer flange, wherein the burner seal includes the inlet flange having a first outer diameter at the second end and the fuel nozzle aperture has a second diameter greater than the first outer diameter so that the burner seal is inserted through the fuel nozzle aperture from the aft side of the dome panel, and wherein the heat-shield aperture has a third diameter that is greater than the first outer diameter of the inlet flange and the retainer flange has a fourth outer diameter that is greater than the third diameter so that the retainer flange engages an aft surface of the heat shield to retain the heat shield to the dome panel after the burner seal is inserted through the fuel nozzle aperture and the heat-shield aperture.

9. The method of claim 6, wherein the step of retaining the inlet flange includes enclosing the inlet flange with a first retainer half-ring formed to include a first semi-circular channel and a second retainer half-ring formed to include a second semi-circular channel, the inlet flange being received in the first and second semi-circular channels when the first retainer half-ring and the second retainer half-ring are installed on the burner seal, and wherein the first and second retainer half rings are engaged with the forward surface of the dome panel to block movement of the burner seal axially aft through the fuel nozzle aperture.

* * * * *